Nov. 9, 1943. H. FOSTER 2,333,922
INSULATED ELECTRICAL CONDUCTOR
Filed July 14, 1941
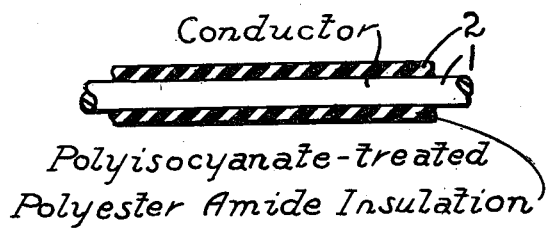
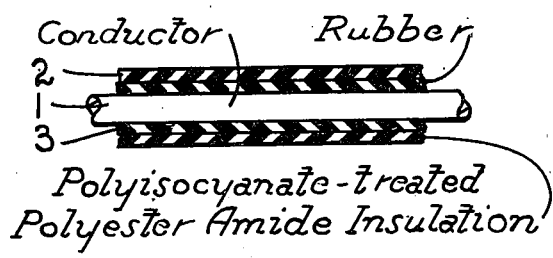
INVENTOR.
Harlan Foster Patented Nov. 9, 1943

2,333,922

UNITED STATES PATENT OFFICE 2,333,922

INSULATED ELECTRICAL CONDUCTOR

Harlan Foster, Wilmington, Del., assignor to E. I. du Pont de Nemours & Company, Wilmington, Del., a corporation of Delaware Application July 14, 1941, Serial No. 402,353

8 Claims. (Cl. 174—125)

This invention relates to electrical insulation and more particularly to electrical conductors provided with an improved synthetic insulating material.

A large number of natural and synthetic materials such as rubber, neoprene, plasticized polyvinyl chloride, polyvinyl formals, and similar products have been employed as insulating coatings for electrical conductors. All these materials, however, suffer in practice from one or more disadvantages such as inferior solvent resistance, undue deterioration with time and exposure, and insufficient inherent pliability to be used without plasticizers which become ineffective with age. Rubber is applied in an uncured state and after application to the conductor requires an expensive and time-consuming vulcanizing step. Furthermore, rubber coatings even after vulcanization are subject to severe attack by many common chemical agents, particularly organic solvents of the hydrocarbon and chlorinated hydrocarbon types. They are also subject to severe attack by atmospheric oxygen and ozone, particularly at high temperatures, leading to embrittlement and cracking of the coating, which introduces the danger of short circuits. Neoprene suffers from somewhat similar disadvantages, though not to so great a degree as rubber. At the same time, neoprene is somewhat deficient in electrical properties. Plasticized polyvinyl chloride undergoes loss of plasticizer on storage or continued use and becomes brittle.

The synthetic linear polyamides have also been proposed for electrical insulation, but the polymers of this kind previously used do not possess the desirable combination of properties which characterize the polymers forming the insulation of the insulated conductors disclosed herein.

This invention has as an object the manufacture of new and useful electrically insulated conductors. A further object is the production of electrically insulated wire and cables which in addition to high insulating value possess unusual solvent resistance and durability and exceptional flexibility, particularly at low temperatures, with retention of the initial high flexibility over long periods of time. Other objects will appear hereinafter.

The above objects are accomplished through the production of electrically insulated conductors in which the insulation is a polyester-amide which has been treated with an organic polyisocyanate.

The polyisocyanate treated polymer can be prepared by the following procedure: The polyester-amide obtained as the initial, usually wax-like, low molecular weight reaction product of a composition containing substantially stoichiometric proportions of amide and ester-forming reactants is reacted at temperatures of 150–250° C. with a polyisocyanate in amount up to 10% and usually from 3 to 7%. The mention herein of the polyisocyanates is intended to include the corresponding isothiocyanates which react similarly. The compounds most advantageously used are the diisocyanates.

The reactants from which the polyester-amides, which have recurring amide, ester, and urethane linkages, can be prepared include a variety of bifunctional materials containing hydroxyl, carboxyl, amino, and alkylamino groups, or materials capable of producing these groups. Thus diamines, glycols, and dibasic acids, amino alcohols, amino acids, and hydroxy acids can be employed in any combination that will bring together the essential types of groups in stoichiometrical quantities. As examples may be mentioned the products formed by the reaction of (1) a dibasic acid, a diamine, and a glycol, or from (2) a dibasic acid and an amino alcohol, or from (3) a dibasic acid, an amino alcohol, and a glycol. The initial low molecular weight reaction product of these ingredients will have free hydroxyl, amino and carboxyl end groups and a plurality of ester and amide linkages in the chain. They lack, in general, the desirable properties of hardness, strength, elongation, elasticity, pliability, and flexibility. When these low molecular weight polyester-amides are treated with a polyisocyanate, products of excellent toughness, pliability, and good thermal plasticity are obtained.

By selecting the proportions of the linear polyamide and polyester-forming reactants such that the ratio of the amide linkages to the ester linkages is from 5% to 50% so that the resulting polyester-amide contains from 50% to 95% ester groups, the insulating material possesses without the addition of plasticizer the high flexibility both at normal and subnormal temperatures which has been referred to previously. The difficulties incident to the use of plasticizing agents, namely, loss of initial flexibility through loss of plasticizer on aging and exudation of the plasticizer at elevated temperatures, is thereby avoided.

The coating of the polymer on the conductor can be carried out in various ways, depending on the properties of the composition being employed and the properties desired in the final article. Thus, the wire may be passed through a solution of the polymer and the solvent evaporated, or sheeting may be prepared, cut into ribbons or bands, and wrapped around the wire. Coating may also be accomplished by drawing the wire through molten polymers, or by extrusion in a conventional wire coating machine. In general, the extrusion method represents the preferred procedure, and the process of coating is carried out in any type of machine known to the wire coating art, such as an ordinary extrusion tubing press.

In the accompanying drawing

Fig. 1 is a sectional view of an insulated conductor in which the insulation described herein is applied in contact with the metal, and Fig. 2 is a similar view in which the insulating material shown in Fig. 1 is applied over other insulating material.

The numeral 1 indicates a conductor insulated with a coating 2 of an organic polyisocyanate treated polyamide which can be applied directly to the conductor or wire 1 or over a first applied coating 3 of rubber or other usual insulating material.

The invention is further illustrated by the following examples in which the parts are by weight.

Example I

Three hundred seventy-five grams of diisocyanate treated polyester-amide is milled on rubber rolls heated to 65–70° C., and 75 grams of tricresyl phosphate and 463 grams of China clay added over the course of about two hours. The composition, which at this stage is tough and readily workable, is applied to wire by any known type of apparatus, for example a standard #1 Royle screw stuffer fitted with a wire coating head carrying a ⅛" die. The body of the machine is heated with superheated steam at 125° C. and the orifice heated directly with a flame. The composition is fed to the stuffer while #14 tinned copper wire is fed through the die. The rate of take off is so adjusted that a $\frac{3}{32}$" coating is laid down on the wire.

The polyisocyanate treated polyamide used in the foregoing example is obtained by the following procedure: A mixture of 721 parts of adipic acid, 315 parts of ethylene glycol, 174 parts of hexamethylenediammonium adipate (the salt of hexamethylene diamine and adipic acid), and 125 parts of water, the last added to assist homogenization, is heated for 32 hours at 200° C. and 760 mm. pressure in a stirred reactor fitted with a suitable condenser system to take off the water formed in the reaction. The product formed at this stage is a light colored wax-like material. Ninety-three parts of this wax is melted at 140° C. in a jacketed, heavy duty mixer and 7 parts of hexamethylene diisocyanate slowly added over a period of 15–20 minutes. The temperature is then raised to 160° C. and the mixing continued for an additional 15 minutes. The product at this point is a very tough, fusible material, insoluble in most organic solvents, including aromatic and aliphatic hydrocarbons and their mixtures.

The insulated wire obtained in accordance with the foregoing example withstands repeated flexes after standing for 24 hours in a freezing mixture at —50° C. It can also be drawn through a 30 foot conduit carrying four right angle bends and two outlet boxes without the surface cutting through.

Example II

The polymer described in Example I is compounded on the rubber rolls at 85° C. in the proportions of 35 parts of polymer and 65 parts of China clay. This hard, tough, solvent-resistant composition is applied to #14 wire in a manner similar to that described in Example I. The rate of take up is so adjusted that a $\frac{1}{16}$" coating is laid down on the wire. The coating so obtained is tough, abrasion-resistant, solvent-resistant, and hard surfaced.

Example III

Forty-one parts of the polymer described in Example I are compounded on rubber rolls at 80° C. with 51 parts of China clay and 8 parts of a chlorinated diphenyl having a specific gravity of 1.543–1.550 and known to the trade as Aroclor 1254 and the resulting composition applied to #14 tinned copper wire as described in Example I. The rate of take up is so adjusted as to lay down a $\frac{3}{32}$" coating on the wire. The coating withstands repeated flexes after standing for 24 hours in a freezing mixture at —50° C. It can also be drawn through a 30 foot conduit carrying four right angle bends and two outlet boxes without the surface cutting through. It is not degraded by three months immersion in lubricating oil, gasoline, kerosene, benzene, carbon tetra-chloride, or carbon disulfide.

Example IV

The polymer used in this example is obtained as follows: A mixture of 89.7 parts of adipic acid, 24.2 parts of ethylene glycol, 13.64 parts of ethanolamine, and 12.4 parts of water is heated for two hours at 170° C. at atmospheric pressure, the temperature then raised to 190° C. and the pressure reduced to 360 mm., these conditions being held for one hour. Finally, the mixture is heated at 190° C. at 3 mm. pressure for six hours. Ninety-five parts of the polymer so formed is heated at 170° C. in a jacketed, heavy duty mixer, and 5 parts of hexamethylene diisocyanate slowly added over a period of 15–20 minutes. The temperature is held at 170° C. and mixing continued for an additional 15 minutes. At this stage the product is a very tough, rubber-like material. Ten parts of this polymer is dissolved in a mixture of 45 parts of chloroform and 45 parts of methanol.

This solution is then placed in a pan which contains a small hole in the bottom which is gasketed with a sheet of neoprene. No. 14 tinned copper wire is passed through the hole in the bottom of the pan upward through the solution and then through a vertical oven 12" in length which is heated to 150° C. The wire, traveling at the rate of 13 ft./min. picks up an even coating of the solution in the pan and then, as it passes into the oven, the solvent is evaporated. The wire is then returned to the solution pan where a second coat is applied. When six coats have been applied in this way the coating is 1.2–1.3 mils in thickness. Wire thus coated has a high degree of resistance to failure on repeated kinking or flexing.

Another method for applying the insulation to wire consists in coating the wire with the initial low molecular weight, low melting polymer which contains the polyisocyanate and then completing the reaction by heat treatment after the coating is applied to the wire, which forms the desired high molecular weight polymer. This method, however, is less convenient since it is difficult in practice to avoid formation of bubbles during the heat treatment of the polymer.

The insulating compositions described herein are tough and pliable and are characterized by a high degree of elasticity or nerve. They may be fabricated by methods known to the art. They may be obtained in either a soluble or insoluble form and the method of their application will depend, therefore, on the particular superpolyester-amide used and the properties desired in the final product. These polymers can be combined with various fillers and modifiers and the resulting modified compositions employed in much the same manner as the original superpolyester-amides. The compounding of the superpolyester-amide with modifiers and fillers can be carried out by mixing in mill mixers or on rubber rolls, with or without the assistance of a small amount of a volatile blending agent to assist homogenization. Or the added materials, if inert, can be incorporated into the composition by mixing with the original reactants prior to starting the reaction, or by mixing with a low molecular weight polyester-amide initially formed but prior to treatment with the polyisocyanate. For most purposes, the quantity of modifiers introduced will range from 20 to 75% of the final composition, the exact amount used depending upon the nature of the superpolyester-amide being employed and the properties desired in the final product. The method of mixing will likewise depend upon these same factors.

Fillers and extenders useful in the present products include wood flour, clay, whiting, vermiculite, mica, leather dust, asbestos, silica, cellulose derivatives, etc. Suitable pigments comprise zinc oxide, carbon black, lakes, azo pigments, Prussian blue, chrome green, titanium oxide, iron oxide, lithol red, lithopone, zinc sulfide, iron blue, blanc fixe, and the phthalocyanines.

In order to improve flow and to facilitate handling the compositions in fabricating machinery, it has been found advantageous to incorporate other modifying agents such as waxes and resins in addition to those mentioned above. Materials which are particularly suited for this purpose include dimethyl sebacate, polyethylene glycol, polyvinyl acetate, and the resins obtained by reacting formaldehyde with para-tertiary butylphenol, para-hydroxydiphenyl, para-tertiary amylphenol, and ortho-cyclohexylphenol. These and other resinous substances such as rosin, hydrogenated rosin, ester gum, hydrogenated ester gum, shellac, gum kauri, copal, etc. may also be incorporated in the compositions to improve water resistance and to increase hardness as well as to improve the milling properties of the product. Resins of the heat-hardening type such as thermosetting phenol-formaldehyde resins, and oil-modified alkyds may be incorporated and subsequently set up by baking to improve the surface hardness.

In the above examples hexamethylene diisocyanate is used for convenience as the diisocyanate reactant but any organic diisocyanate or diisothiocyanate may be used in its place, including monoisocyanate-monoisothiocyanates, i. e., any compound of the general formula XCNRNCY where X and Y are selected from the group consisting of sulfur and oxygen and R is a divalent organic radical. The invention thus includes the use of ethylene diisocyanate, trimethylene dioscyanate, tetramethylene diisocyanate, hexamethylene diisocyanate, decamethylene diisocyanate, heptylidene diisocyanate and the corresponding diisothiocyanates; cycloalkylene diisocyanates and diisothiocyanates, e. g. cyclopentylene diisocyanate, cyclohexylene diisocyanate; aromatic diisocyanates and diisothiocyanates, e. g. m-phenylene diisocyanate, naphthalene diisocyanate and diphenyl-4,4'-diisocyanate; aliphatic-aromatic diisocyanates and diisothiocyanates, e. g. xylene-1,4-diisocyanate and 4,4'-diphenylenemethane diisocyanate; and diisocyanates and diisothiocyanates containing hetero atoms, such as $SCNCH_2OCH_2NCS$ and $SCN-(CH_2)_3-S-(CH_2)_3NCS$.

The preferred diisocyanates and diisothiocyanates are of the type, $OCN-R-NCO$ and $SCN-R-NCS$, wherein R represents saturated divalent hydrocarbon radicals with a chain length of at least two carbon atoms. Of these the polymethylene derivatives are preferred.

While diisocyanates and diisothiocyanates are preferred because of their greater availability and the readiness with which they react, the invention is generic to compounds of the type $R(NCX)_z$ where X is oxygen or sulfur and z is a plural integer, i. e., more than one, including compounds having at least one isocyanate and at least one isothiocyanate group. The invention thus includes the use of polyisocyanates and polyisothiocyanates, e. g., benzene-1,2,4-triisothiocyanate and 1,2,2-triisocyanatobutane.

The lower polymer acted upon by the diisocyanate or diisothiocyanate is made from ingredients comprising a dibasic carboxylic acid or an ester-forming derivative thereof, e. g., a halide, anhydride or an ester with a volatile monohydric alcohol with at least one complementary bifunctional compound, or a mixture of bifunctional compounds, comprising at least one esterifiable hydroxy group and at least one hydrogen bearing amino group.

Any dibasic carboxylic acid or ester-forming derivative thereof may be employed to form the low polymers acted upon by the diisocyanate including carbonic, malonic, succinic, maleic, glutaric, suberic, azelaic, β-methyl adipic, hexahydroterephthalic, diphenic, p-phenylenediacetic, thiodibutyric, acetone-dicarboxylic, diglycollic, pimelic, undecanedioic, isophthalic acid, brassilic, 6-ketoundecanedioic, and 4-ketopimelic acids and anhydrides, acid halides, half-esters and diesters thereof.

The preferred dibasic acids are of the formula $HOOC-R-COOH$ wherein R represents a saturated divalent hydrocarbon radical with a chain length of at least four carbon atoms.

The second essential component of the low molecular weight polymer is a complementary bifunctional compound or a mixture of bifunctional compounds, comprising at least one esterifiable hydroxy group and at least one hydrogen bearing amino group. Thus, this second component may comprise amino alcohols, mixtures of glycols and diamines, mixtures of glycols and amino alcohols, mixtures of amino alcohols and diamines, or mixtures of all three. Likewise, mixtures of amino acids and hydroxy acids may be used per se.

Any glycol may be employed in the formation of the low polymer, including, in addition to those indicated in the examples, diethylene glycol, triethylene glycol, pentamethylene glycol, hexamethylene glycol, decamethylene glycol and N,N-diethanolaniline.

Any amino alcohol having at least one hydrogen atom attached to the amino nitrogen atom may be employed including aromatic amino alcohols, e. g., p-hydroxymethylbenzylamine, 4-hydroxymethyl-4-aminomethyldiphenyl and p- aminophenylethyl alcohols; aliphatic amino alcohols, e. g., 5-aminopentanol-1; 6-amino-5-methylhexanol-1, 4(p-aminophenyl)cyclohexanol, hydroxyethoxyethoxyethlamine, and N-(β-aminoethyl)-N(ω-hydroxyhexyl)-aniline.

The preferred amino alcohols are of formula HO—R—NH₂ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

The term polymer connotes a certain minimum sum of the radical lengths of the dibasic carboxylic acid and glycol or amino alcohol. The radical length of the acid is the number of atoms in the chain between and including the carboxyl carbons. The radical length of the glycol is the number of atoms in the chain between and including the hydroxyl oxygens. The radical length of the amino alcohol is the number of atoms between and including the amino nitrogen and the hydroxyl oxygen. Thus in the polymer

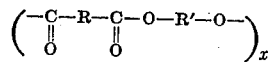

the structural unit is

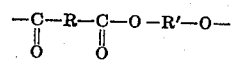

and the unit length is the sum of the radical lengths of the acid whose residue in the polymer is

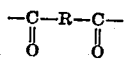

and of the glycol whose residue in the polymer is —O—R'—O—. Similarly the structural unit of a polymer obtained from a dibasic acid and an amino alcohol is

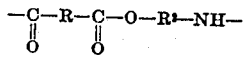

the unit length of which is the sum of the radical lengths of the acid and the amino alcohol. The unit length, as thus defined, of the polymer is at least seven.

Optional bifunctional components include diamines, amino acids, and hydroxy acids.

Any diamine may be employed, which contains at least one hydrogen atom attached to each amino nitrogen atom. The preferred diamines are of formula NH₂RNH₂ where R represents saturated divalent hydrocarbon radicals with a chain length of at least two carbon atoms, e. g., ethylenediamine, haxamethylenediamine, 3-methylhexamethylene-diamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula HO—R—COOH where R represents saturated divalent hydrocarbon radicals, e. g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

Various derivatives of the linear polymer-forming reactants previously mentioned can be used. A number of available compounds, for example, can replace the amino acids, diamines, and dicarboxylic acids, and it is to be understood that mention herein to these reactants is intended to include their equivalent amide-forming derivatives. Amide-forming derivatives of the amino acids include the esters, anhydrides, amides, lactams, acid halides, N-formyl derivatives, carbamates, and nitriles in the presence of water. Amide-forming derivatives of the dicarboxylic acids comprise the mono- and di-esters, the anhydrides, the mono- and di-amides, acid halides, and the following compounds in the presence of water: Nitriles, cyanocarboxylic acids, cyanoamides, and cyclic imides. Amide-forming derivatives of the diamines include the carbamates, N-formyl derivatives and the N,N'-diformyl derivatives.

Although materials such as phenols and sulfonamide compounds are compatible with and capable of plasticizing the polyisocyanate treated polyester-amides, the use of these materials in the present insulating compositions as has been previously noted is neither necessary nor desirable.

As stabilizers, materials such as hexamethylene bissalicylamide, hydroquinone, aminophenols, ortho-hydroxymethoxyacetic acid, ortho-methoxyphenoxyacetic acid, and ortho-phenylenediacetic acid may be employed. These stabilizers act to improve the resistance of the insulation to degradation by heat, light, and outdoor exposure.

When polyester-amides are being compounded in mixers or rolls, and more particularly when being sheeted or extruded, it is advantageous to have present a modifier that will act as an antisticking agent and will facilitate release of the material from the working surface of the equipment. To accomplish this it has been found useful to add small quantities of such materials as carnauba wax, diamylphthalate, dioctylphthalate, dilaurylphthalate, diethyleneglycol dicresyl ether, ethyleneglycol monobenzyl ether, stearic acid, oleic acid, sodium stearate, zinc stearate, aluminum stearate, dibutyl ammonium oleate, and dibutyl ammonium stearate.

The modifiers can be incorporated into the insulating composition in several ways. Some polyester-amides will permit mixing while in solution, while others will require softening with heat and milling in the modifier. In the case of inert modifiers, the blending may be carried out with the melted low molecular weight materials prior to treatment with the polyisocyanate or may even be mixed in with the initial ester and amide-forming ingredients prior to condensation.

The insulating material used in the practice of this invention can be applied to wires of any size and as coatings of any desired thickness. The insulation can be applied to various types of wires such as copper, tin, aluminum, steel, bronze, silver, and different types of alloys may be used as conductors. Several successive layers of compositions based upon polyester-amides can be coated in a series of operations. Or the conductor can be initially coated with a layer of material such as neoprene, rubber, plasticized polyvinyl chloride, or polyvinyl formal and a coating of the present polyester-amide composition applied on top of this additional layer. Also the conductor can be initially coated with the polyester-amide composition and this coating operation followed with outer layers consisting of such materials as neoprene, rubber, plasticized polyvinyl chloride, polyvinyl formal, and other coating compositions known to the art. Likewise a plurality of different coatings may be laid down alternating in any desired manner.

Electrical conductors coated with the insulating compositions described herein are adapted to all applications where pliability, toughness, and resistance to oils, fats, and solvents, particularly of the hydrocarbon type is desired. Wire thus coated may be used in code wire, in industrial applications where there is exposure to oils, fats, and hydrocarbons, and more particularly where these conditions are present simultaneously with severe abrasion. For example, the coated wires of this invention may be advantageously employed in the food handling and dairy industry where fat and grease are encountered; in the petroleum industry, particularly in the drilling and refining stages; and in the chemical industry particularly around small portable equipment. Further this wire may find application in household appliances where the conductors are subjected to frequent change in position and commonly are left in intimate contact with the floor thus being subjected to severe flexural and abrasive action. In their preferred form, the polyisocyanate treated polyesteramides used in this invention are rubbery and do not cold draw, therefore affording a resilient coating which can absorb a deformation without becoming permanently deformed.

The present insulation can be used advantageously in several types of electrical apparatus such as separators between cells in storage batteries as well as for the casings and separators between the cells; the insulation separating the plates of condensers; and as the coil insulation and slot lining of motors or generators. The present insulation because of its high resistance to the action of chemicals is suited for use as the insulation of refrigerator motors in systems where the insulation comes in contact with the sulfur dioxide, dichlorodifluromethane or other chemically reactive refrigerant.

As many apparently widely different embodiments of this invention may be made without departing from the spirit and scope thereof, it is to be understood that I do not limit myself to the specific embodiments thereof except as defined in the appended claims.

I claim:
1. An insulated electrical conductor in which the insulation comprises a high molecular weight polymer which comprises the reaction product of an organic polyisocyanate with a wax-like low molecular weight linear polyester-amide in which the ratio of the ester groups to the amide groups is from 50% to 95%.

2. An insulated electrical conductor in which the insulation comprises a high molecular weight polymer which comprises the reaction product of an organic polyisocyanate with the initial wax-like low molecular weight reaction product of a linear polymer-forming composition which comprises a dibasic carboxylic acid, a diamine and a glycol and which yields a polyester-amide in which the ratio of the ester groups to the amide groups is from 50% to 95%.

3. An insulated electrical conductor in which the insulation comprises a high molecular weight polymer which comprises the reaction product of an organic polyisocyanate with the initial wax-like low molecular weight reaction product of a linear polymer-forming composition which comprises a dibasic carboxylic acid and a mono-aminomonohydroxy alcohol and which yields a polyester-amide in which the ratio of the ester groups to the amide groups is from 50% to 95%.

4. The electrical conductor as defined in claim 1 in which said polyisocyanate is an organic diisocyanate.

5. The electrical conductor as defined in claim 2 in which said polyisocyanate is an organic diisocyanate.

6. The electrical conductor as defined in claim 3 in which said polyisocyanate is an organic diisocyanate.

7. An insulated electrical conductor in which the insulation comprises a high molecular weight polymer which comprises the reaction product of an organic polyisocyanate with the initial wax-like low molecular weight reaction product of a linear polymer-forming composition which comprises a dibasic carboxylic acid, a glycol, and an amino alcohol and which yields a polyester-amide in which the ratio of the ester groups to the amide groups is from 50% to 95%.

8. The insulated conductor set forth in claim 7 in which said dibasic acid is adipic acid, said glycol is ethylene glycol, and said amino alcohol is ethanol amine.

HARLAN FOSTER.